Sept. 30, 1958 R. M. WOLFE 2,854,590
COUNTING CIRCUITS EMPLOYING FERROELECTRIC CAPACITORS
Filed Dec. 12, 1955 2 Sheets-Sheet 1

INVENTOR
R. M. WOLFE
BY
[signature]
ATTORNEY

INVENTOR
R. M. WOLFE
BY
ATTORNEY

United States Patent Office 2,854,590

Patented Sept. 30, 1958

2,854,590

COUNTING CIRCUITS EMPLOYING FERRO-ELECTRIC CAPACITORS

Robert M. Wolfe, Colonia, N. J., assignor to Bell Telephone Laboratories, Incorporated, New York, N. Y., a corporation of New York Application December 12, 1955, Serial No. 552,459

17 Claims. (Cl. 307—88.5)

Figure 1:
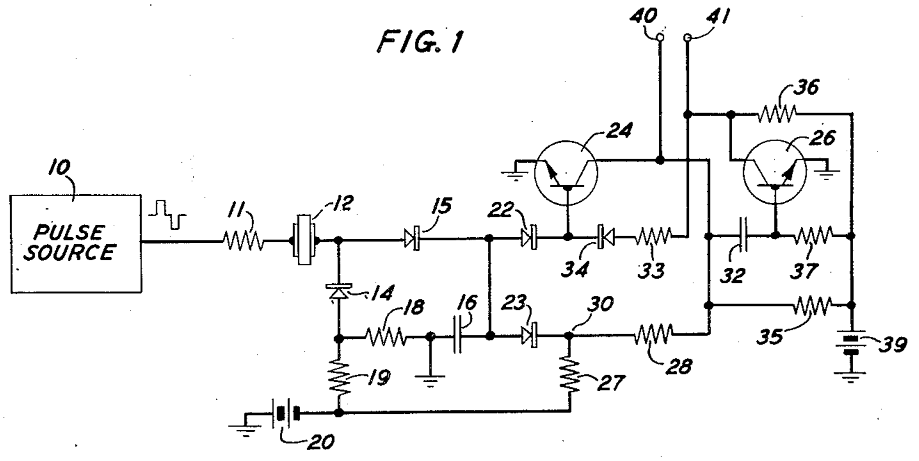

This invention relates to electrical circuits and, more particularly, to circuits for the counting of distinct pulses.

It is often necessary in electrical circuits to control the delivery of an accurately predetermined or metered charge to a load independent of variations in the magnitude and duration of the pulses available to supply this load. I have discovered that a ferroelectric capacitor exhibits a characteristic such that it may be employed to perform such charge metering function. If a pulse is applied to one terminal of a ferroelectric capacitor of sufficient magnitude to shift the remanent polarization from one stable state to the other stable state, a predetermined charge is delivered from the other terminal of the capacitor, the value of which depends upon the area of the electrodes of the ferroelectric capacitor. This discrete charge is delivered regardless of the magnitude and duration of the pulse applied to the ferroelectric capacitor so long as the applied pulse is sufficient to overcome the opposing coercive force exhibited by the capacitor. If the applied pulse is of insufficient magnitude to overcome the coercive force, then no pulse is transmitted through the capacitor.

Accordingly, it is an object of this invention to provide an improved circuit for delivering a predetermined or metered charge to a load circuit.

It is another object of this invention to provide improved counting circuits.

It is still another object of this invention ot provide an improved discrete charge counting circuit in which the charges delivered to and removed from the counting circuit are accurately metered.

Briefly, in accordance with aspects of this invention, a ferroelectric capacitor is inserted in series between a pulse source and a capacitive integrator circuit accurately to control or meter the charge delivered to the integrator circuit. If alternate positive and negative pulses are applied from the pulse source, the ferroelectric capacitor will be switched from one stable state to the other and back to its initial state. During each switching operation a predetermined pulse is delivered through the capacitor and, by selection of the pulses of proper polarity, these pulses may be appleid to the charge integrating circuit. The integrating circuit adds the unitary charges until it is fully charged, at which time a signal indicative of the predetermined total number of pulses is delivered to the load. Since the charges supplied to the integrating circuit are accurately determined by the charge metering ferroelectric capacitor, the integrating circuit will deliver an accurate output independent of the magnitude and duration of the input pulses. Further, this integrating circuit will not be affected by random noise or pulses of short duration which are insufficient to overcome the coercive force of the ferroelectric capacitor. A second pulse source and a second ferroelectric capacitor may be connected to the integrating circuit in a similar manner to deliver accurate pulses of opposite polarity to the integrating circuit effectively to subtract the previously stored pulses.

Accordingly, it is a feature of this invention that a ferroelectric capacitor be connected between a pulse source and an integrating capacitor accurately to control the charge delivered to the integrating capacitor.

It is a further feature of this invention that the switching of a ferroelectric capacitor delivers a predetermined charge to an integrating capacitor on application of a pulse of one polarity to the ferroelectric capacitor, a path being provided for resetting of the ferroelectric capacitor by application of a pulse of the opposite polarity. Further, in accordance with this feature of the invention, the ferroelectric charge metering capacitor is reset after each charge metering operation.

It is another feature of this invention that the integrating capacitor itself may be a ferroelectric capacitor. In accordance with this feature of the invention, the meteing ferroelectric capacitor has an electrode area which is approximately a submultiple of the integrating circuit ferroelectric capacitor electrode area.

It is still another feature of this invention that the integrating capacitor may be connected to a pair of ferroelectric charge metering capacitors having approximately the same electrode areas and having distinct pulse sources connected thereto. In accordance with this feature of the invention, a pulse of proper polarity from one of the pulse sources causes a charging or adding in the integrating capacitor while a pulse of proper polarity from the other pulse source causes a discharging or subtracting in the integrating capacitor.

A complete understanding of this invention and of these and various other features thereof may be gained from consideration of the following detailed description and the accompanying drawing in which:

Figs. 1, 2, 3 and 4 are schematic representations of specific illustrative embodiments of this invention.

Referring now to Fig. 1 of the drawing, there is depicted, in accordance with one specific embodiment of this invention, a pulse source 10 which is connected through a resistor 11 to one electrode of ferroelectric capacitor 12. Connected to the other electrode of capacitor 12 is an integrating circuit including diodes 14 and 15 and capacitor 16. Resistors 18 and 19 are used as a voltage divider in combination with source 20 of negative potential to apply a negative bias to diode 14. Diodes 22 and 23 are employed in combination with the flip-flop circuit including transistors 24 and 26 to control the discharge of the integrating circuit and deliver output signals in response to this discharge as will subsequently be explained in detail. Resistors 27, 28 and 35 together with sources 20 and 39 form a voltage divider for applying various potentials throughout the circuit. Coupling capacitor 32 is connected between the collector of transistor 24 and the base of transistor 26 effectively to deliver a control pulse, which pulse causes the "toggle" operation of the flip-flop circuit. Resistor 33 and diode 34 form a feedback path between the collector of transistor 26 and the base of transistor 24. Resistors 35, 36 and 37 are connected to source 39 of positive potential and to various points in the flip-flop circuit to supply operating potentials to the circuit. Terminals 40 and 41 are output terminals at which pulses appear 180 degrees out of phase with respect to each other when the flip-flop circuit is actuated.

An understanding of the cooperation between the ferroelectric capacitor and the pulse counting circuit in accordance with this invention can be gained from consideration of the operation of the specific embodiment of this invention depicted in Fig. 1 and just described above. Pulse source 10 supplies alternate positive and negative pulses of magnitude sufficient to switch the remanent polarization of ferroelectric capacitor 12. Assuming that the remanent polarization of capacitor 12 is in a direction to be reversed by the application of positive pulses from source 10, then the first positive pulse will reverse the remanent polarization of capacitor 12 and during this reversing operation will transmit a discrete charge through diode 15 to integrating capacitor 16. On the subsequent negative pulse supplied from source 10, which is negative with respect to the potential at the point intermediate resistors 18 and 19, the remanent polarization of capacitor 12 will be reversed or reswitched to its initial direction of polarization. The next subsequent positive pulse will again reverse the remanent polarization of capacitor 12 delivering another discrete charge through diode 15 to integrating capacitor 16 while the next subsequent negative pulse will again restore the remanent polarization of capacitor 12 to its initial condition.

This operation of storing discrete charges on capacitor 16 continues until that capacitor reaches its fully charged condition, at which time it applies a positive potential through diode 22 to the base of normally nonconducting transistor 24 sufficient to cause transistor 24 to conduct, thereby causing a pulse to be delivered from the collector of transistor 24 through capacitor 32 to the base of normally conducting transistor 26. This pulse effectively turns off or renders transistor 26 nonconducting and causes a pulse to be delivered from the collector of transistor 26 to output terminal 41 as well as to the base of transistor 24 through the feedback path including resistor 33 and diode 34. When the base of transistor 24 is initially rendered positive by the potential through diode 22, the potential at point 30, which is ordinarily positive, is rendered negative due to the effective application of ground intermediate resistors 28 and 35 by the conduction of transistor 24. This decrease in potential at point 30 effectively removes the positive back-bias normally applied to diode 23 and applies a forward negative potential thereby causing a complete discharge of capacitor 16 returning the pulse counting circuit to its initial condition. Thus, the operation of ferroelectric capacitor 12, which effectively acts as a closed circuit only during the ferroelectric polarization switching interval, controls the application of discrete charges to the integrating circuit and provides for accurate counting of the input pulses irrespective of the magnitude and duration of these pulses.

Figure 2:
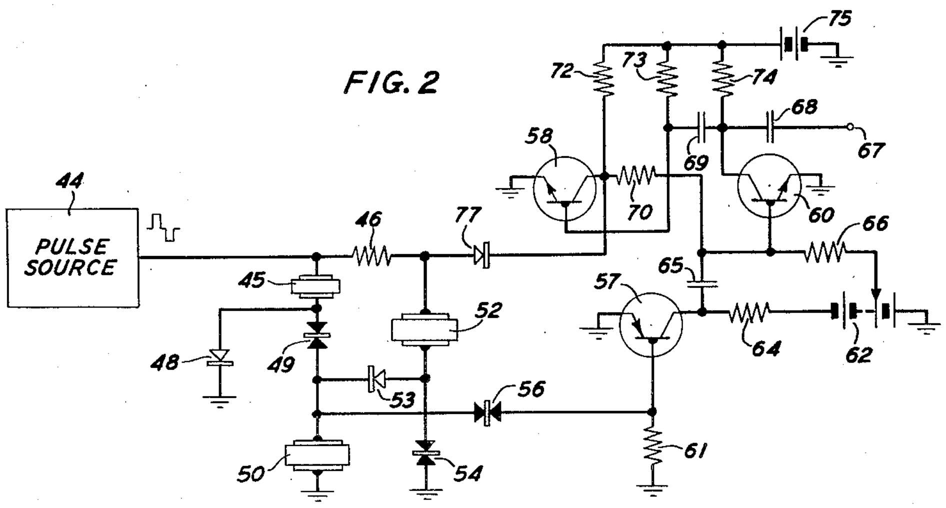

Fig. 2 depicts a pulse counting circuit, in accordance with another specific embodiment, in which the integrating circuit includes an integrating ferroelectric capacitor. Pulse source 44 is connected to one electrode of a charge metering ferroelectric capacitor 45 and to resistor 46. The opposite terminal of ferroelectric capacitor 45 is connected to diode 48 and double anode saturation diode 49. The saturation characteristics of these diodes, commonly called Zener diodes, are discussed on pages 827 through 835 of The Bell System Technical Journal, volume 33, No. 4, July 1954. A charge integrating ferroelectric capacitor 50 is connected between the other terminal of Zener diode 49 and a source of reference potential, such as ground. The electrode area of ferroelectric capacitor 50 is a predetermined multiple of the electrode area of ferroelectric capacitor 45. This predetermined multiple represents the total number of pulses of one polarity to be counted by the counting circuit. A resetting ferroelectric capacitor 52 is connected between resistor 46 and integrating capacitor 50 by means of diode 53. The electrode area of capacitor 52 is slightly larger than the electrode area of capacitor 50 to insure that resetting of capacitor 50 takes place. Double anode diode 54 is connected between one electrode of capacitor 52 and a source of reference potential, such as ground, to provide a resetting path for ferroelectric capacitor 52.

A double anode diode 56 is connected between one electrode of integrating capacitor 50 and the base of transistor 57 to provide an output path for the integrating circuit. Connected to the output of diode 56 is transistor 57, which responds to a total indicating output signal and triggers the monostable multivibrator defined by transistors 58 and 60. A resistor 61 is connected between the base of transistor 57 and ground or a source of reference potential to maintain transistor 57 in a normally nonconducting condition. A source 62 of negative potential is connected through resistor 64 to the collector of transistor 57. A capacitor 65 serves to couple the output of transistor 57 to the base of transistor 60. A resistor 66 is connected between a negative point of source 62 and the base of transistor 60 to maintain this transistor in a normally nonconducting condition. A capacitor 68 is connected to the collector electrode of transistor 60 and thus provides an output path for the total indicating signal. A capacitor 69 is connected between the collector of transistor 60 and the base of transistor 58 to provide a feedback path for the flip-flop controlling pulses while resistor 70 provides a feedback path between the collector of transistor 58 and the base of transistor 60. Resistors 72, 73 and 74 are connected between a source 75 of positive potential and various points in the flip-flop circuit to apply operating potentials to these points. A diode 77 is connected between one terminal of capacitor 52 and the collector of transistor 58 to by-pass the positive pulses around capacitor 52 while the counting operation is taking place. The impedance presented by diode 77 is under the control of transistor 58 and, in response to a total indicating signal delivered to the flip-flop circuit, this impedance is changed to a high value to control the resetting of the integrating circuit as will be explained below.

For the purpose of explaining the operation of this pulse counting circuit, assume that pulse source 44 is supplying a train of alternate positive and negative pulses. However, the storage capabilities of ferroelectric capacitor 50 are such that the pulses need not be supplied in a continuous chain but may be applied at random over an extended period of time if capacitor 45 is reswitched after each storage pulse. Assume also that the remanent polarization of each of capacitors 45, 50 and 52 is in a downward direction such that a pulse of negative polarity from source 44 will tend to reverse each of these capacitors. The first negative pulse is effectively applied across capacitor 45, Zener diode 49 and integrating capacitor 50 in series. The charge which flows in this circuit is effectively metered by capacitor 45 such that only an integral portion of the remanent polarization of capacitor 50 is reversed. This negative pulse is also applied through resistor 46 across capacitor 52 and Zener diode 54 to overcome the breakdown potential of diode 54 and reverse the remanent polarization of capacitor 52. The next subsequent positive pulse reverses the remanent polarization of capacitor 45 through diode 48 but has no effect upon the integrating capacitor 50 as the saturation point of diode 49 is not reached. This positive pulse is also fed through resistor 46 and is by-passed to ground through diode 77 and the low impedance presented by normally conducting transistor 58. The next subsequent negative pulse from source 44 again reverses the remanent polarization of capacitor 45 and delivers another discrete charge through diode 49 to capacitor 50. This negative pulse has no effect on capacitor 52 as the polarization of this capacitor is not in a direction to permit the passage of this negative pulse through diode 54 to ground. Subsequent positive and negative pulses are transmitted through capacitor 45 as discrete charges through diodes 48 and 49, respectively. Integration continues until the remanent polarization of capacitor 50 is reversed completely. Sometime during the application of the last pulse to capacitor 50, a negative charge transmitted by capacitor 45 passes through diodes 49 and 56. This charge is the total indicating signal and triggers transistor 57.

The operation of the ferroelectric integrating capacitor 50 in counting the individual pulses and transmitting an indicating signal to transistor 57 can be considered as follows. Each pulse from source 44 causes a discrete and accurately predetermined amount of charge to be transmitted through the charge metering ferroelectric capacitor 45 to the integrating capacitor 50. Each discrete amount of charge apparently causes the dielectric of the capacitor 50 to traverse partially a minor hysteresis loop, resulting in the dielectric being left with a remanent polarization removed from its prior remanent polarization. This continues until the remanent polarization has reached the amount of charge determined by the major hysteresis loop of the dielectric. At this time no further switching action can occur. A ferroelectric capacitor, having a dielectric which will not switch, appears in the circuit as a substantially infinite impedance and any subsequent charge or pulse will be shunted from it to an alternate path. Accordingly, if the remanent polarization reaches the final amount of charge during the last applied pulse, the latter portion of that pulse will be shunted through diode 56 to transistor 57 and will serve as the total indicating signal.

It is possible in certain circuit arrangements to have the last pulse just result in the dielectric reaching its final amount of charge, in which case the next pulse from the pulse source in its entirety will be shunted to the transistor 57 and serve as the total indicating signal. As a ferroelectric capacitor, while its dielectric is switching, appears as a low resistance, no indicating signal will be transmitted through the diode 56 prior to the ferroelectric capacitor 50 attaining its final stage of charge.

The above operation should be considered in contradistinction to the operation of the integrating capacitor 16 in Fig. 1. In the embodiment of Fig. 1, the integrating capacitor is an ordinary capacitor not employing a ferroelectric material as its dielectric. In such a case the build-up of charge in the capacitor results in a corresponding build-up of voltage across the plates of the capacitor. Accordingly, the output circuitry for the integrating capacitor may be merely made voltage sensitive so that when the charge on the capacitor 16 builds up to a predetermined value, the voltage has also built up to the point where, in the specific embodiment of Fig. 1, the transistor 24 will be triggered. However, a ferroelectric capacitor always has zero potential across its plates when in the quiescent state, that is, when the dielectric of the capacitor is not being switched. Accordingly, the output circuitry to ascertain that the predetermined amount of charge has been built up in the ferroelectric capacitor cannot be voltage sensitive but may instead, as described above, take advantage of the fact that the ferroelectric capacitor while switching represents a low resistance but when not switching, as when the charge has built up to its final value, represents substantially an open circuit.

The transistor 57, in triggering in response to the total indicating signal, in turn transmits a pulse through capacitor 65 rendering transistor 60 conducting. In response to this change in conductivity of transistor 60, a pulse is transmitted through capacitor 69 to the base of transistor 58 switching transistor 58 to its nonconducting state. When transistor 58 becomes nonconducting, it effectively removes ground from the cathode of diode 77 and this cathode is rendered positive by source 75. Diode 77 is now back-biased preventing the passage of subsequent positive pulses from source 44. Hence, the next positive pulse switches the polarization of capacitor 52 through diode 53 and thus resets integrating capacitor 50. Since transistors 58 and 60 comprise a monostable multivibrator, transistor 58 returns to its conducting condition delivering a pulse to transistor 60 through resistor 70 rendering transistor 60 nonconducting. Thus, the pulse counting circuit is again in its initial condition.

Thus, the charge metering capabilities of a ferroelectric capacitor may be employed to control the charge delivered to a ferroelectric integrating capacitor while achieving the additional advantage of long term storage due to the charge storing capabilities of the ferroelectric integrating capacitor.

Figure 3:
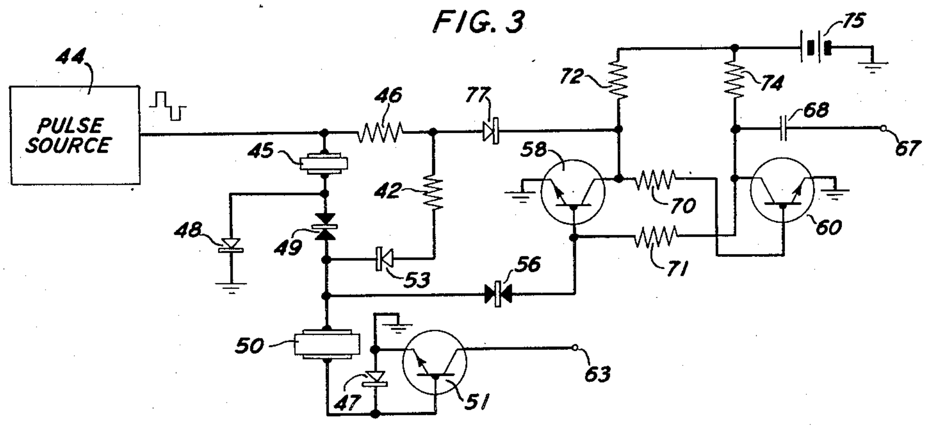

Fig. 3 depicts a pulse counting circuit, in accordance with another specific embodiment of this invention, employing a ferroelectric integrating circuit and a ferroelectric charge metering capacitor in a manner somewhat similar to Fig. 2; in Fig. 3 components similar to those employed in Fig. 2 are referred to by the same reference numeral. In this circuit, however, the total indicating signal is fed serially through the integrating capacitor, whereas, in Figs. 1 and 2 the output circuit is connected in parallel with the integrating capacitor. Also, in Fig. 3 the circuit for resetting capacitor 50 contains fewer components than that of Fig. 2. A further distinction is the circuitry including transistors 58 and 60 which defines a bistable multivibrator.

Assume for the purposes of explaining the operation that alternate positive and negative pulses are to be delivered from source 44, the first negative pulse is effectively metered by capacitor 45 and a discrete charge is fed through this capacitor to integrating capacitor 50. This charging path is completed by diode 47. On the next positive pulse, capacitor 45 is switched and a discrete charge is bypassed to ground through diode 48. A positive pulse from source 44 is also fed through resistor 46 and diode 77 to ground through transistor 58 which is normally conducting. This operation continues until the predetermined number of pulses reverses the initial polarization of integrating capacitor 50. An output signal indicating the total integrated charge is also delivered through diode 56 to transfer the bistable multivibrator defined by transistors 58 and 60 to its other state in which transistor 58 is nonconducting. Ground is effectively removed from the cathode of diode 77 and the cathode is positively back-biased by source 75 through resistor 72. This back-bias causes the next positive pulse from source 44 to be delivered through resistors 46 and 42 and through diode 53 to reverse or reset the polarization of capacitor 50 through transistor 51. This resetting pulse effectively delivers a total indicating signal to terminal 63. In response to a resetting pulse delivered to capacitor 50, a pulse is delivered through saturation diode 56 to the base of transistor 58 resetting the bistable multivibrator to its initial condition. Thus, the pulse counting circuit is restored to its initial condition.

Figure 4:
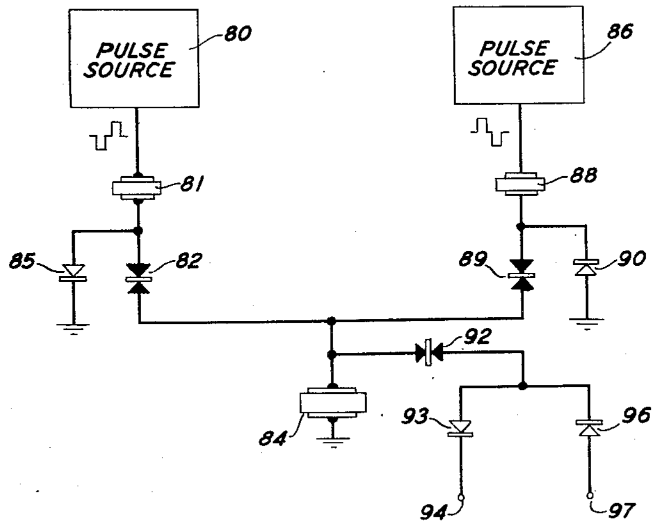

Fig. 4 depicts a pulse counting circuit using charge metering ferroelectric capacitors to meter both the charging and discharging of an integrating capacitor. Pulse source 80 is connected through ferroelectric metering capacitor 81 and double anode Zener diode 82 to integrating ferroelectric capacitor 84. Diode 85 is connected between a source of reference potential and a point intermediate capacitor 81 and diode 82. In a similar manner, pulse source 86 is connected through charge metering capacitor 88 and double anode Zener diode 89 to integrating capacitor 84. Diode 90 is connected between a source or reference potential and a point intermediate capacitor 88 and diode 89 in opposite polarity to the connection of diode 85. Also connected to the integrating capacitor 84 is one electrode of double anode Zener diode 92. A pair of diodes 93 and 96 are connected to the other electrode of diode 92 to establish paths for output pulses of opposite polarity to output terminals 94 and 97. The electrode areas of each of capacitors 81 and 88 bear a relationship with the electrode area of capacitor 84 approximately equal to a predetermined integral submultiple. While the pairs of pulses from each of pulse sources 80 and 86 are always alternate in polarity, the order in which these pulses are delivered is different for the two pulse sources. For example, if pulse source 80 supplies a positive and a negative pulse in that order then pulse source 86 supplies a negative and a positive pulse in that order.

Assume for the purpose of explanation of the operation that the remanent polarization of capacitors 81 and 84 is in a downward direction while the remanent polarization of capacitor 88 is in an upward direction. A negative pulse followed by a positive pulse from source 80 will first store a discrete negative charge on integrating capacitor 84 through metering capacitor 81 and Zener diode 82, and then reverse or reset the polarization of capacitor 81 through diode 85. A positive pulse followed by a negative pulse from source 86 will effectively deliver a metered charge through capacitor 88 and diode 89 storing a positive charge on integrating capacitor 84 and resetting metering capacitor 88 through diode 90. Thus, negative pulses from source 80 are effectively being added by integrating capacitor 84 while positive charges from source 86 are effectively subtracting these negative charges from capacitor 84. If the operation of pulse source 80 continues without interruption or subtraction of charges by pulse source 86, then the integrating capacitor 84 will reach its completely reversed condition and thereby cause an output signal to be delivered through diodes 92 and 96 to terminal 97. If, however, positive charges were to be added, these charges would be supplied by source 86 and, upon completion of the adding sequence, the polarization of capacitor 84 would again be reversed, thus causing an output signal to be delivered through diodes 92 and 93 to terminal 94. Thus, it is possible to meter both the charging and discharging of an integrating circuit by means of ferroelectric capacitors as well as to determine either extreme condition of the storage capacitor. It is to be understood that the operation could be changed to a converse manner by reversing the initial polarization of capacitors 81 and 88 and reversing the polarization of diodes 85 and 90. The counting circuit would then effectively add positive pulses from source 80 while subtracting negative pulses from source 86.

It is to be understood that the above-described arrangements are illustrative of the application of the principles of the invention. Numerous other arrangements may be devised by those skilled in the art without departing from the spirit and scope of the invention.

What is claimed is:

1. An electrical circuit including a pulse source, a load responsive to a plurality of discrete electrical charges of the same polarity, charge metering means adapted to deliver a unitary charge to said load independent of the magnitude and duration of the pulses from said pulse source, said charge metering means including a charge metering ferroelectric capacitor connected between said pulse source and said load, said load including an integrating ferroelectric capacitor having an electrode area which is an integral multiple of the electrode area of said first-mentioned ferroelectric capacitor and further including means for resetting said integrating ferroelectric capacitor, said resetting means including a third ferroelectric capacitor having an electrode area at least equal to the electrode area of said integrating ferroelectric capacitor, and output means connected to said load.

2. An electrical circuit including a pulse source, a load responsive to a plurality of discrete electrical charges of the same polarity, charge metering means adapted to deliver a unitary charge to said load independent of the magnitude and duration of the pulses from said pulse source, said charge metering means including a charge metering ferroelectric capacitor connected between said pulse source and said load, said load including an integrating ferroelectric capacitor having an electrode area which is an integral multiple of the electrode area of said first-mentioned ferroelectric capacitor and further including means for resetting said integrating ferroelectric capacitor, said resetting means including unilateral impedance means, and output means connected to said load.

3. A pulse counting circuit comprising a pulse source, an integrating circuit including an integrating capacitor, charge metering means including a ferroelectric capacitor, means serially connecting said ferroelectric capacitor and said integrating capacitor to said pulse source for pulses of one polarity, output means connected to said integrating circuit, and means for removing the charge from said integrating capacitor after the application thereto of a predetermined number of metered pulses of said one polarity from said pulse source, said removing means including a diode and means for changing the impedance state of said diode after the application of said predetermined number of metered pulses of said one polarity to said integrating capacitor.

4. A pulse counting circuit according to claim 3 in which said integrating capacitor has a normal dielectric and said diode is normally back-biased, said removing means including means responsive to the voltage of said integrating capacitor for forward biasing said diode to discharge said capacitor.

5. A pulse counting circuit according to claim 3 in which said integrating capacitor has a ferroelectric dielectric and said diode is connected in series with said pulse source to by-pass pulses of the opposite polarity, said removing means further including means responsive to the high impedance state of said ferroelectric integrating capacitor to back-bias said diode and a path between said diode and said ferroelectric integrating capacitor for resetting said capacitor to its initial polarization state.

6. A pulse counting circuit according to claim 5 in which said path for resetting said ferroelectric integrating capacitor includes an additional ferroelectric capacitor having an electrode area at least equal to the electrode area of said ferroelectric integrating capacitor.

7. A pulse counting circuit according to claim 5 in which said path for resetting said ferroelectric integrating capacitor includes a second diode.

8. A pulse counting circuit including a first pulse source, an integrating circuit, a first charge metering ferroelectric capacitor serially connected between said pulse source and said integrating circuit for controlling the charging of said integrating circuit, a second pulse source, a second charge metering ferroelectric capacitor connected between said second pulse source and said integrating circuit for controlling the discharge of said integrating circuit, and output means connected to said integrating circuit.

9. A pulse counting circuit according to claim 8 further including means for resetting said charge metering ferroelectric capacitors.

10. A pulse counting circuit according to claim 9 wherein said integrating circuit includes a ferroelectric capacitor having an electrode area which is approximately equal to a predetermined multiple of the electrode area of said first charge metering ferroelectric capacitor.

11. A pulse counting circuit according to claim 10 wherein the electrode area of said second charge metering capacitor is approximately equal to the electrode area of said first charge metering capacitor.

12. A pulse counting circuit including a pulse source, an integrating capacitor, charge metering means including a ferroelectric capacitor connected between said pulse source and said integrating capacitor, diode means connected between said integrating capacitor and said ferroelectric capacitor, unilateral impedance means connected between a point intermediate said ferroelectric capacitor and said diode means and a point of reference potential, and output means connected to said integrating capacitor and adapted to indicate a predetermined number of pulses.

13. A pulse counting circuit according to claim 12 wherein said diode means is a double anode saturation diode.

14. A pulse counting circuit according to claim 13 wherein said integrating capacitor is a ferroelectric capacitor having an electrode area approximately equal to a predetermined multiple times the electrode area of said charge metering ferroelectric capacitor and further including means for resetting said integrating ferroelectric capacitor.

15. A pulse counting circuit according to claim 14 wherein said means for resetting said integrating ferroelectric capacitor includes a resetting ferroelectric capacitor having an electrode area bearing a predetermined relationship with the electrode area of said integrating ferroelectric capacitor.

16. A pulse counting circuit according to claim 15 wherein the electrode area of said resetting ferroelectric capacitor is slightly greater than the electrode area of said integrating ferroelectric capacitor.

17. A pulse counting circuit including an integrating capacitor, a first pulse source, a first charge metering ferroelectric capacitor connected between said first pulse source and said integrating capacitor, a second pulse source, a second charge metering ferroelectric capacitor connected between said second pulse source and said integrating capacitor, and output means connected to said integrating circuit wherein the electrode area of said first charge metering ferroelectric capacitor is approximately equal to the electrode area of said second charge metering ferroelectric capacitor.

References Cited in the file of this patent

UNITED STATES PATENTS

| | | |
|---|---|---|
| 2,573,150 | Lacy | Oct. 30, 1951 |
| 2,695,396 | Anderson | Nov. 23, 1954 |
| 2,717,372 | Anderson | Sept. 6, 1955 |